Oct. 4, 1966    H. ERDMANN    3,276,238
PLIER-LIKE ASSEMBLY TOOL
Filed May 18, 1964    3 Sheets-Sheet 1
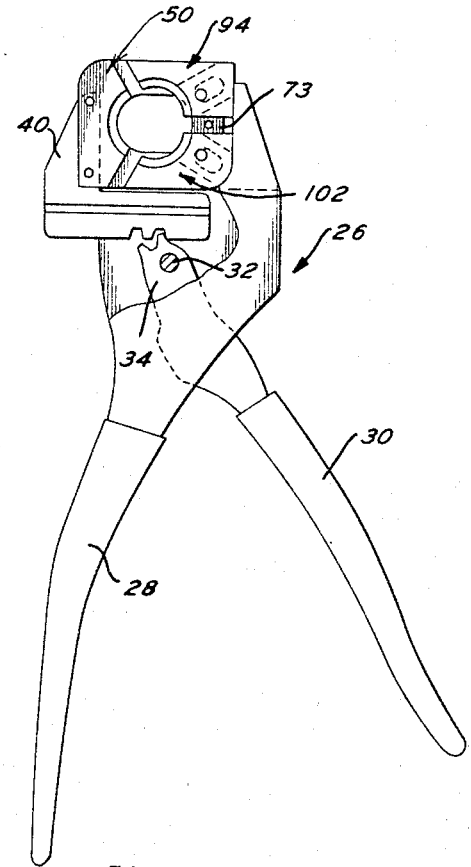
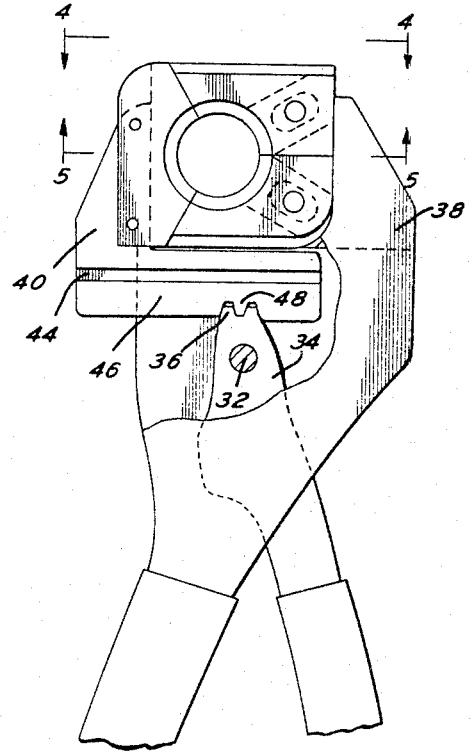
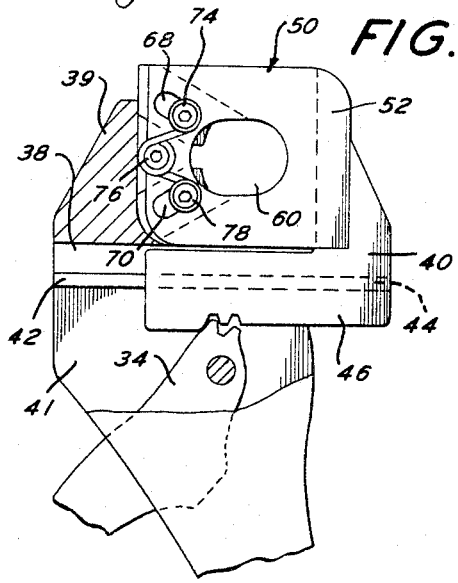
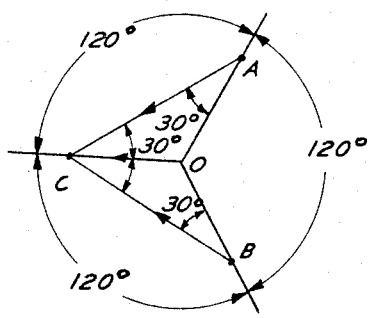
INVENTOR
HANS ERDMANN
BY *Seidel & Gonda*
ATTORNEYS.

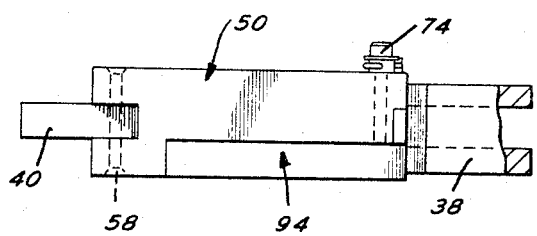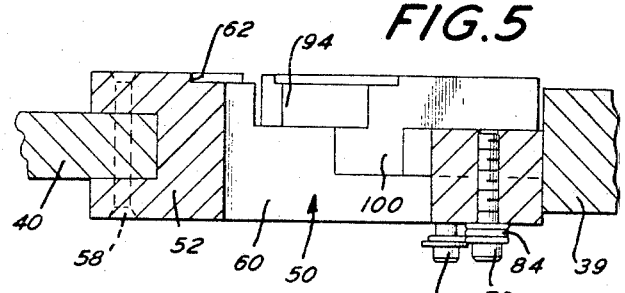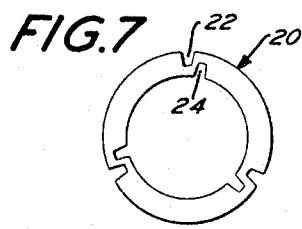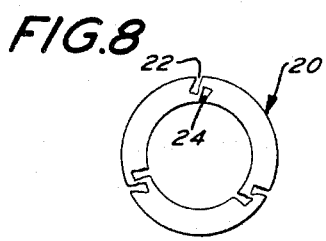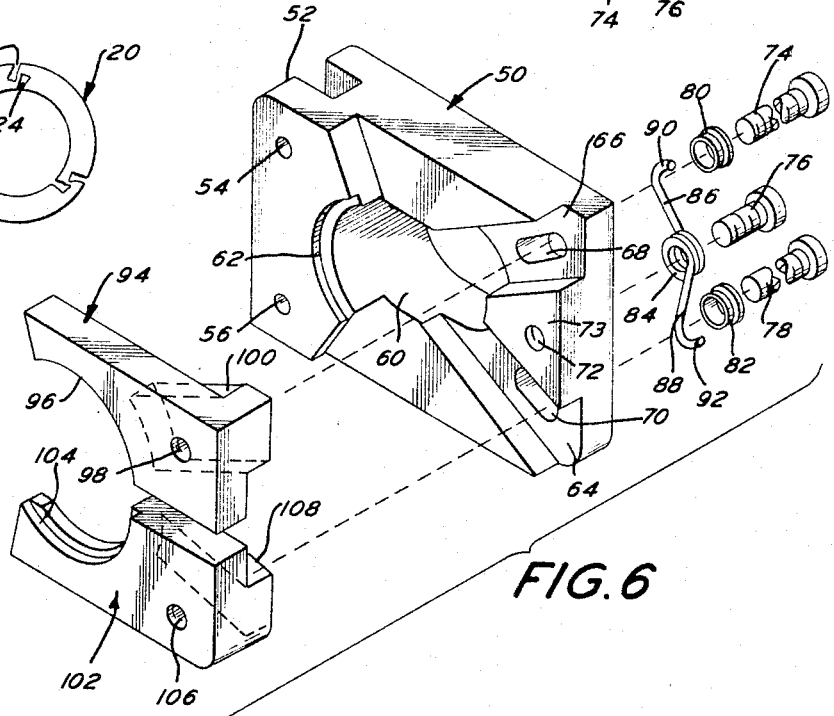

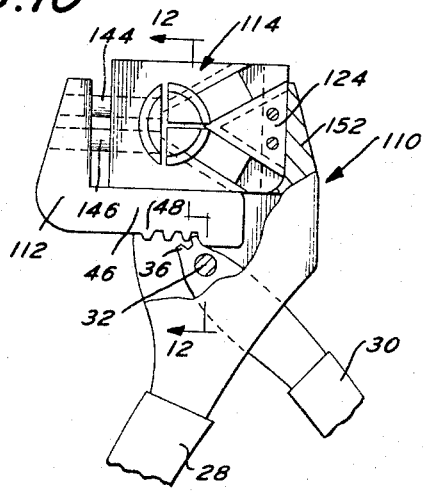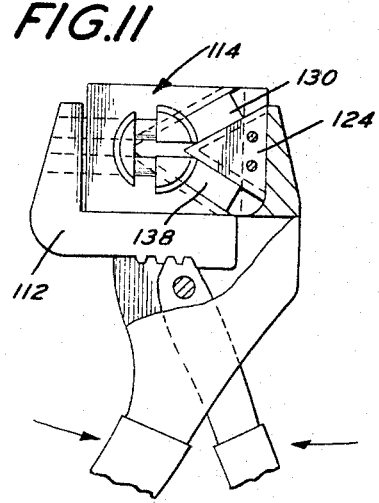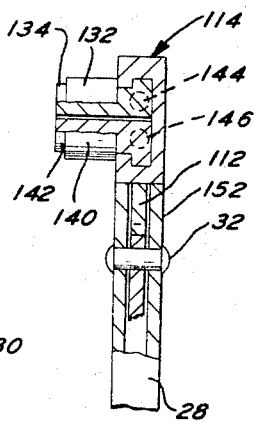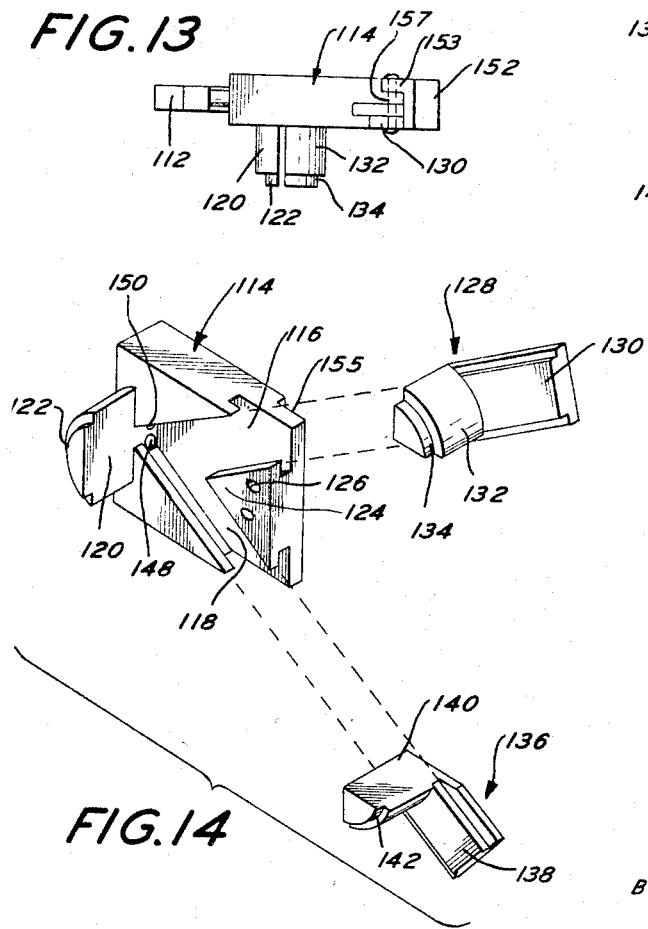

United States Patent Office 3,276,238
Patented Oct. 4, 1966

3,276,238
PLIER-LIKE ASSEMBLY TOOL
Hans Erdmann, Maplewood, N.J., assignor to Waldes Kohinoor, Inc., Long Island City, N.Y., a corporation of Pennsylvania
Filed May 18, 1964, Ser. No. 368,115
6 Claims. (Cl. 72—410)

This invention relates to a plier-like assembly tool for mounting retaining rings on a cylindrical shaft or in a bore.

Patent 2,889,852, issued June 2, 1959, to G. O. Conner, discloses a non-resilient deformable lock ring. It is customary when an article is to be held upon a cylindrical shaft or in a bore to provide a circular groove in the shaft or bore adjacent to the article. A ring is placed within the groove formed in the shaft or bore. The ring, disclosed in the above patent, is of such a size that it slips readily over the shaft or into the bore without binding until it is opposite to the groove. Pressure is applied to the ring to distort it, forcing it into the groove in a tight and substantially permanent manner.

The ring is made deformable by notches in its inner and outer periphery which are arranged so that they are substantially closed or expanded, respectively as the case may be, under pressure. In this manner, the ring diameter is decreased or increased as the case may be and the ring forced into the groove.

The construction of a hand operated tool for assembling retaining rings of the character discussed presents a difficult problem. For example, in conventional pliers, two working jaws are activated by two handle elements. The working jaws move in accordance with the straight line motion of the handle elements to which they are connected. Therefore, the plier jaws exert pressure at two diametrically opposite points. This pressure, when exerted on a retaining ring periphery, will of necessity be non-uniform. Non-uniform pressure would tend to cause an elliptical distortion of the ring. The result is that the ring abuts the bottom of the groove at single points only instead of along all points on its periphery. Hence, when the shaft or bore mounting the retaining ring is subjected to substantial thrust loads or vibrations, the unsecure ring will fail.

To eliminate these drawbacks, symmetrical pressure is exerted on the periphery of the ring to uniformly deform all portions of the ring by means of the tool of the present invention.

Accordingly, it is the main object of this invention to provide an assembly tool for uniformly deforming a retaining ring.

It is another object of this invention to disclose a plier-like assembly tool for uniformly deforming a retaining ring by the conventional straight-line motion of the handle elements of the tool.

Yet another object of this invention is to disclose a plier-like assembly tool for uniformly compressing a deformable retaining ring into a seat formed on the outer periphery of a cylindrical shaft.

Another object of this invention is to provide a plier-like assembly tool for uniformly expanding the diameter of a deformable retaining ring into a seat formed in the tubular wall of a cylindrical bore.

Other objects will appear from the disclosure which follows hereinafter.

For the purpose of illustrating the invention, there are shown in the drawings forms which are presently preferred; it being understood, however, that this invention is not limited to the precise arrangements and instrumentalities shown.

FIGURE 1 is a side view in elevation of a first form of the assembly tool for uniformly compressing a deformable retaining ring into a seat on the outer periphery of a cylindrical shaft.

FIGURE 2 is an enlarged side view in elevation of the upper portion of the tool shown in FIGURE 1 but illustrating the position of the tool components in their pressure-applying position.

FIGURE 3 is a view similar to FIGURE 2 but of the opposite side of the tool, partly in section, and illustrating the position of the tool components in their non-pressure-applying position.

FIGURE 4 is a top plan view, partly in section, as seen along the plane indicated by the line 4—4 of FIGURE 2.

FIGURE 5 is a cross sectional view taken substantially along the plane indicated by the line 5—5 of FIGURE 2.

FIGURE 6 is an exploded perspective view of the jaws of the tool illustrated in FIGURE 1.

FIGURE 7 is a side view in elevation of a deformable retaining ring adapted to be compressed by the tool.

FIGURE 8 is a side view of the ring shown in FIGURE 7 but illustrating the ring after it has been compressed.

FIGURE 9 is a diagrammatic view illustrating the principle of operation of the tool.

FIGURE 10 is a fragmentary view in side elevation of the upper portion of a second embodiment of the tool for uniformly expanding the diameter of a deformable retaining ring into a seat formed in the walls of a cylindrical bore.

FIGURE 11 is a view similar to FIGURE 10 but illustrating the position of the components of the tool in their pressure-applying position.

FIGURE 12 is a cross sectional view taken substantially along the plane indicated by the line 12—12 of FIGURE 10.

FIGURE 13 is a top plan view of the tool illustrated in FIGURE 10.

FIGURE 14 is an exploded perspective view of the jaws of the tool illustrated in FIGURE 10.

Referring now to the drawings in detail, wherein like numerals indicate like elements, a retaining ring 20 is illustrated in FIGURES 7 and 8. The retaining ring 20 includes a plurality of radially extending notches on its outer periphery. Notches 22 open in a radially outward direction. A plurality of radially extending notches are also formed on the inner periphery of the ring 20. The notches 24 open in a radially inward direction.

The ring 20 is formed from deformable, non-resilient material. The ring 20 is adapted to be placed in a groove formed either on the periphery of a cylindrical shaft or in the bore of a tubular member. If placed on a cylindrical shaft, pressure on the outer periphery of the ring 20 will deform the ring as shown in FIGURE 8 causing its inner diameter to decrease, thus locking the ring to the shaft. When the ring 20 is placed within a bore, outwardly directed pressure along its inner diameter will cause its outer diameter to expand, thereby locking the ring in a groove in the bore.

Before proceeding with a description of the tools for locking the ring 20 in place, attention is directed to FIGURE 9 which shows diagrammatically the principle of operation of the tools. In FIGURE 9, A and B symbolize the centers of arcuate abutment surfaces on a pair of relatively movable jaws. The abutment surfaces are adapted to engage and either compress or expand the ring 20. C represents the center of an arcuate abutment surface on a relatively stationary jaw. The three abutment surfaces are spaced from each other at angles of 120 degrees. To exert uniform pressure on the inner or outer periphery of a ring all three abutment surfaces should move simultaneously towards or away from the center O.

Ideally, three simultaneously movable abutment surfaces, each moving towards or away from a fixed center, would exert uniform pressure upon contact with a cylindrical object. However, such a tool would not only be difficult and costly to manufacture, but incapable of operation by a single person. Hence, surface C is rendered stationary and thus cannot move to O. However, the same result would be reached if O moved to surface C or, since this is impossible, an equivalent motion from A and B to C.

AOC and BOC are equilateral triangles. It was assumed that the angles formed by the legs AO, CO, and BO, are 120 degrees. Therefore, the angles OCA and OCB must be 30 degrees. Consequently, AC and BC have to move towards and away from C at an angle of 30 degrees to the center line OC. This motion will result in the uniform compression of a deformable retaining ring positioned between symmetrical arcuate abutment surfaces on the jaws.

A plier-like assembly tool generally designated by the numeral 26 is illustrated in FIGURES 1–6. The plier-like assembly tool 26 includes means for simultaneously engaging the outer periphery of the ring 20 to uniformly compress and deform it.

The tool 26 includes actuating means such as a pair of handles 28 and 30 pivotably connected to each other by a pivot pin 32. The handle 30 includes a head 34. The handle 28 includes a head 38. The head 38 includes a solid portion 39 and a hollow portion 41. The head 34 of the handle 28 is pivotably mounted within the hollow portion 41 of the head 38.

A ring compressing mechanism is supported between the heads on the handles. The ring compressing mechanism includes an L-shaped block 40 having a transversely extending rib 44. The rib 44 is slideably connected to a groove 42 within the hollow head portion 38.

The L-shaped block 40 includes a rack bar portion 46 below the rib 44. The rack bar portion 46 has a plurality of rack teeth 48 in meshing engagement with convolute gear teeth 36 mounted at one end of the head 34 of the handle 30.

The jaw structure generally designated by the numeral 50 is mounted on the short leg of the L-shaped block 40. The jaw 50 will hereafter be designated as a stationary jaw because it does not move in relation to the retaining ring and the shaft on which the retaining ring is to be fastened. The stationary jaw structure 50 includes a bifurcated end 52 secured in surrounding relation to the short leg of the L-shaped block 40. The bifurcated end 52 includes a pair of spaced apertures 54 and 56 for receiving rivets 58 to connect it to the L-shaped block 40.

The stationary jaw structure 50 includes an elliptical opening 60. The elliptical opening 60 allows the tool 26 to be passed over a cylindrical shaft on which the retaining ring 20 is to be permanently connected. The stationary jaw structure 50 also includes an arcuate abutment surface 62. The abutment surface 62 is a groove in the stationary jaw 50 and has a length of approximately 120 degrees.

A pair of inclined tracks 64 and 66 are cut in the stationary jaw 50. The tracks 64 and 66 converge towards the center line through the abutment surface 62 at an angle of 30 degrees. Formed through the base of the tracks 64 and 66 are a pair of elongated slots 68 and 70. The formation of the tracks 64 and 66 results in a substantially V-shaped projection 73 extending outwardly from the stationary jaw structure 50.

A top movable jaw 94 including an inclined rail 100 is slideably disposed within the track 66 on the stationary jaw 50. The movable jaw 94 includes an arcuate abutment surface 96 having a length of approximately 120 degrees. A threaded aperture 98 is formed in the jaw 94 through the rail 100.

A bottom movable jaw 102 having an inclined rail 108 is slideably disposed within the track 64. The jaw 102 includes an arcuate abutment surface 104 having a length of approximately 120 degrees. A threaded aperture 106 is formed through the rail 108.

In assembling the jaws 94 and 102 on the stationary jaw structure 50, the rails 100 and 108 are placed in their respective tracks. A spring 84 is provided. The spring 84 includes a pair of upright arms 86 and 88. A hook 90 is formed at the end of the arm 86. Similarly, a hook 92 is formed at the end of the arm 88.

A threaded fastener is adapted to extend through the coils of the spring 84 and threadably connect the spring to the threaded aperture 72 in the projection 73. The hook 90 is placed about the head of a threaded fastener 74. The threaded fastener 74 extends through the elliptical slot 68 and is threadably connected to the threaded aperture 98 in the rail 100. A spacer 80 placed in the slot 68 and the threaded fastener 74 is tightened on the head of the spacer 80. This permits the jaw 94 to slide freely back and forth although the screw 74 is tight.

The hook 92 of the spring 84 is placed on the head of a threaded fastener 78. The threaded fastener 78 is adapted to extend through the elliptical slot 70 and be threadably connected to the threaded aperture 106 through the rail 108. The spacer 82 again permits the threaded fastener 78 to be tightened and the jaw 102 to slide freely back and forth.

The operation of the plier-like assembly tool 26 is substantially as follows:

With the parts of the tool assembled and illustrated in FIGURES 1 and 3, the arms 86 and 88 of the spring 84 will bias the movable jaws 94 and 102 into abutment with the solid head portion 39 of the handle 28. In this position of the elements, the arcuate abutment surfaces 62, 96 and 104 are spaced from each other so as to form an irregular shape.

A retaining ring 20 may then be placed within an annular groove formed on the outer periphery of a cylindrical shaft. The tool 26 is then passed over the shaft by moving the elliptical opening 60 along the shaft. The retaining ring to be deformed is placed in engagement with the abutment surface 62 on the stationary jaw structure 50. The handles 28 and 30 are then moved towards each other.

When the handles 28 and 30 are moved towards each other, the gear teeth 36 at the top of the handle 30 mesh with the rack teeth 48 on the L-shaped block 40. This tends to cause the L-shaped block 40 to move towards the right as viewed in FIGURE 2. However, alternative movement is provided for in the present invention. Movement of the handles towards each other causes the solid head portion 39, which abuts the rails 100 and 108 on the movable jaws, to push the jaws in their tracks towards the stationary jaw 50. The rails 100 and 108 will slide in the tracks 66 and 64 against the bias of the spring 84. The inclined motion of the rails of the movable jaws, cause the arcuate abutment surfaces 96 and 104 to move vertically and horizontally towards the arcuate abutment surface 62. The ring is simultaneously grasped and pressure is applied at all points of the ring periphery.

As seen in FIGURE 2, when the abutment surfaces are adjacent to each other at the end of the reciprocable stroke of the rails of the movable jaws, they form a cylindrical surface. This cylindrical surface has a diameter slightly less than the outer diameter of the ring. Hence, when the abutment surfaces apply pressure uniformly to all points on the ring periphery, the ring will be compressed and permanently locked to the shaft on which it is mounted.

When the handles 28 and 30 are released, the spring 84 returns the components of the compressing mechanism to the position illustrated in FIGURES 1 and 3. The tool can then be removed from the shaft.

FIGURES 10–14 illustrate a second embodiment of the plier-like assembly tool which is generally designated by the numeral 110. The tool 110 is used for uniformly expanding the diameter of a deformable retaining ring seated within a groove in a bore.

The tool 110 includes an L-shaped block 112. As in the tool 26, the block 112 includes a rack portion 46 having a plurality of rack teeth 48 in meshing engagement with convolute gear teeth 36 on the end of the handle 30.

A jaw structure generally designated by the reference numeral 114 is provided. The jaw structure 114 will hereinafter be referred to as a stationary jaw because it does not move with respect to the deformable retaining ring and the groove in which the retaining ring is to be expanded. The stationary jaw structure 114 includes a projection 120 adjacent one end thereof. The projection 120 has an arcuate abutment surface 122 whose length is slightly less than 120 degrees.

A pair of inclined tracks 116 and 118 are cut in the stationary jaw structure 114. The tracks 116 and 118 are inclined at 30 degrees with respect to a center line through the projection 120.

A substantially V-shaped projection 124 spaces the tracks 116 and 118. The projection 124 has a pair of apertures 126 which also extend through the rails 116 and 118.

A top movable jaw 128 has a rail portion 130 slideably mounted within the inclined track 116. The jaw 128 includes a projection 132 having an arcuate abutment surface 134. The arcuate abutment surface 134 corresponds to a segment of a circle. The length of the segment 134 is slightly less than 120 degrees.

A bottom movable jaw 136 has a rail portion 138 slideably mounted within the track 118. The jaw 136 includes a projection 140 having an arcuate abutment surface 142. The arcuate abutment surface 142 corresponds to a segment of a circle. The segment 142 has a length slightly less than 120 degrees.

As shown in FIGURE 13, the head portion of the handle 28 includes a hollow portion and a substantially L-shaped solid portion 152. The stationary jaw structure 114 is mounted on the head portion 152. The short leg 153 of the head portion 152 is placed in abutment with the sides of a groove formed in the back of the stationary jaw structure 114. Rivets such as 157 are placed within the apertures 126 in the V-shaped projection 124 to rigidly secure the stationary jaw to the head portion 152.

The L-shaped block 112 mounts a pair of parallel pins 144 and 146. The pins 144 and 146 are telescopically received within the stationary jaw structure 114. This is accomplished by slideably disposing the pins 144 and 146 in a pair of cylindrical apertures 150 and 148 formed in an edge of the stationary jaw structure 114 and in the projection 120. The pins 144 and 146 are adapted to abut the rails 130 and 138 in the open position of the tool as indicated in FIGURE 10.

The operation of the tool 110 is substantially as follows:

A retaining ring 20 is placed within the bore of a tubular shaft and seated loosely within a groove adjacent one end of the shaft. With the tool in its open position as shown in FIGURE 10, the projections 120, 132, and 140 are placed within the bore of the tubular shaft. The abutment surfaces 122, 134 and 142 on the projections are adapted to be placed within the retaining ring 20 adjacent its inner periphery.

The handles 28 and 30 of the tool are then moved towards each other as shown in FIGURE 11. The gear teeth 36 mesh with the rack teeth 48 and move the block 112 to the right as viewed in FIGURE 11. Movement of the block 112 will cause the pins 144 and 146 to move to the right. The pins 144 and 146 will push the rails 130 and 138 along the tracks 116 and 118. The abutment surfaces 134, 142 and 122 will simultaneously engage the inner periphery of a ring 20 and apply uniform pressure to the ring in an outward radial direction.

At the end of the reciprocable stroke of the rails 130 and 138 away from the projection 120, the abutment surfaces 122, 134, and 142 will form a cylinder. The outer diameter of this cylinder is slightly greater than the inner diameter of the ring 20. Hence, the ring diameter will be uniformly expanded between the abutment surfaces and the groove walls.

When the handles 28 and 30 are moved away from each other as seen in FIGURE 10, the pressure on the inner periphery of the ring will be relieved. The tool may then be withdrawn axially from the bore in the shaft.

The present invention may be embodied in other specific forms without departing from the spirit or essential attributes thereof and, accordingly, reference should be made to the appended claims, rather than to the foregoing specification as indicating the scope of the invention.

I claim:

1. A plier-like assembly tool for uniformly compressing a deformable retaining ring, said tool comprising a pair of handle elements pivotably connected to each other, a ring compressing mechanism supported between said handle elements, said mechanism including three jaws, one of said jaws including an opening therethrough, a groove in said jaw adjacent a portion of said opening for engaging a retaining ring, a groove in each of said two other jaws adapted to engage a retaining ring simultaneously with said one jaw, means slideably mounting said other two jaws in a pair of converging tracks on said one jaw adjacent an opposite portion of said opening with their grooves facing the groove in said one jaw, and means responsive to pivotable movement of said handle elements for sliding said other two jaws along said tracks.

2. A plier-like assembly tool for uniformly expanding the diameter of a retaining ring, said tool comprising a pair of handle elements pivotably connected to each other, a ring deforming mechanism supported between said handle elements, said mechanism including three jaws, each jaw including an abutment surface for engaging and deforming a retaining ring, one of said jaws including a substantially planar surface, a pair of tracks in said planar surface converging towards the abutment surface on said one jaw, means slideably mounting said other two jaws in said tracks, and means responsive to pivotable movement of said handle elements for sliding said other two jaws along said tracks, the abutment surfaces on said jaws projecting outwardly beyond said planar surface.

3. An assembly tool for uniformly deforming a retaining ring, said tool comprising a pair of handle elements pivotably connected to each other, a ring deforming mechanism supported between said handle elements, said mechanism including three jaws, one of said jaws including an opening therethrough, a groove in said jaw adjacent a portion of said opening for engaging a retaining ring, a groove in each of said other two jaws adapted to engage a retaining ring simultaneously with said one jaw, a pair of inclined tracks on said one jaw converging towards an abutment surface on said one jaw, a rail on each of said other two jaws slideably mounted within said tracks, spring means supported by one of said jaws for urging said other two jaws along said tracks into abutment with an end of one of said handle elements, rack means connected to the other end of said one jaw, means mounting said rack means on said one handle element for reciprocable movement, and a pinion on one end of said other handle element in meshing engagement with said rack means, the abutment surfaces on said jaws being approximately 120 arcuate degrees in length.

4. An assembly tool for uniformly deforming a retaining ring, said tool comprising a pair of handle elements pivotably connected to each other, a ring deforming mechanism supported between said handle elements, said mechanism including three jaws, each jaw including an abutment surface for engaging and deforming a retaining ring, one of said jaws including a substantially planar surface, a pair of tracks in said planar surface converging towards the abutment surface on said one jaw, a rail on said other two jaws slideably mounted within said tracks, a permanent connection between one end of said one jaw and an end of one of said handle elements, rack means slideably connected to the other end of said one jaw, said slideable connection including pin means connected to said rack means and telescopically received within said one jaw in pushing engagement with said other two jaws, a pinion on one end of said other handle element in meshing engagement with said rack means, the abutment surfaces on said jaws being approximately 120 arcuate degrees in length and projecting outwardly beyond said planar surface.

5. An assembly tool for uniformly deforming a retaining ring, said tool comprising a pair of handle elements pivotably connected to each other, a ring deforming mechanism supported between said handle elements, said mechanism including three jaws, each jaw including an abutment surface for engaging and deforming a retaining ring, and means responsive to pivotable movement of said handle elements for reciprocating two of said jaws toward and with respect to the third jaw, said means including a pair of tracks on said third jaw converging towards the abutment surface on the third jaw, a rail on each of said reciprocating jaws slideably mounted within said tracks, mechanical means connected to said handle elements for sliding said rails in said tracks, said mechanical means including spring means supported by one end of said third jaw for urging said reciprocable jaws along said tracks into abutment with an end of one of said handle elements, rack means connected to the other end of said third jaw, means mounting said rack means on said one handle element for reciprocable movement, and a pinion on one end of said other handle element in meshing engagement with said rack means.

6. An assembly tool for uniformly deforming a retaining ring, said tool comprising a pair of handle elements pivotably connected to each other, a ring deforming mechanism supported between said handle elements, said mechanism including three jaws, each jaw including an abutment surface for engaging and deforming a retaining ring, and means responsive to pivotable movement of said handle elements for reciprocating two of said jaws toward and with respect to the third jaw, said means including a pair of tracks on said third jaw converging towards said surface on the third jaw, a rail on each of said reciprocating jaws slideably mounted with said tracks, mechanical means connected to said handle elements for sliding said rails in said tracks, said mechanical means including a permanent connection between one end of said third jaw and an end of one of said handle elements, rack means slideably connected to the other end of said third jaw, said slideable connection including pin means connected to said rack means and telescopically received within said third jaw for pushing engagement with said reciprocating jaws, and a pinion on one end of said other handle element in meshing engagement with said rack means.

References Cited by the Examiner

UNITED STATES PATENTS

| | | | |
|---|---|---|---|
| 2,601,547 | 6/1952 | Minock. | |
| 2,787,925 | 4/1957 | Buchanan et al. | 81—308 X |
| 2,840,081 | 6/1958 | Moose | 81—309 X |
| 3,109,333 | 11/1963 | Anderson | 81—303 X |
| 3,203,221 | 8/1965 | Conner | 29—229 X |

WILLIAM FELDMAN, *Primary Examiner.*

J. C. PETERS, *Assistant Examiner.*